United States Patent [19]

Baumann et al.

[11] 3,894,014

[45] July 8, 1975

[54] PRODUCTION OF OXAZINE DYES

[75] Inventors: Hans Baumann, Ludwigshafen; Udo Mayer, Frankenthal, both of Germany

[73] Assignee: Badische Anilin- & Soda-Fabrik Aktiengesellschaft, Ludwigshafen (Rhine), Germany

[22] Filed: Feb. 26, 1973

[21] Appl. No.: 335,695

[30] Foreign Application Priority Data
Mar. 2, 1972 Germany............................ 2210074

[52] U.S. Cl.............................. 260/244 R; 260/242
[51] Int. Cl............................................ C09b 19/00

[58] Field of Search...................................... 260/244

[56] References Cited
UNITED STATES PATENTS
534,809  2/1895  Bierer ................................. 260/245
613,578  11/1898  Harpe et al. ........................ 260/245

Primary Examiner—Harry I. Moatz

[57] ABSTRACT

The production of basic oxazine dyes by the reaction of 3-alkoxy-4-azoaniline derivatives with meta-aminophenols in the presence of acidic condensing agents.

11 Claims, No Drawings

PRODUCTION OF OXAZINE DYES

The invention relates to a process for the production of oxazine dyes of the formula (I):

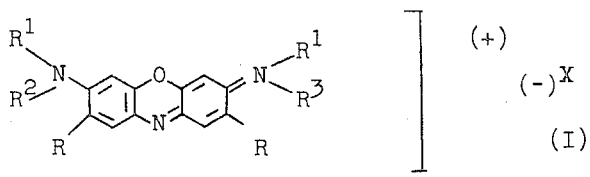

in which
R is hydrogen, methyl, methoxy or ethoxy;
$R^1$ is hydrogen, alkyl or one to four carbon atoms, benzyl or phenylethyl;
$R^2$ is hydrogen, alkyl of one to four carbon atoms, cyanoethyl, hydroxyalkyl of two or three carbon atoms, phenyl or methylphenyl;
$R^3$ is hydrogen, alkyl of one to four carbon atoms or cyanoethyl; and
$X^{(-)}$ is an anion wherein a compound of the formula (II):

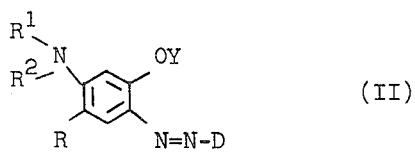

is reacted with a compound of the formula (III):

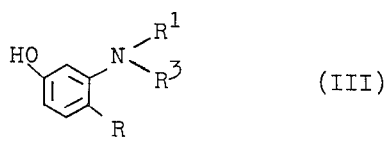

in the presence of an acid condensing agent, Y being alkyl and D the radical of a diazo component.

Examples of alkyl radicals Y, $R^1$, $R^2$ and $R^3$ are propyl and butyl and preferably methyl and ethyl.

Examples of hydroxyalkyl radicals are β-hydroxyethyl and β-hydroxypropyl.

The anions $X^{(-)}$ may be simple or complex inorganic or organic anions, for example chloride, bromide, sulfate, nitrate, phosphate, formate, acetate, toluenesulfonate, tetrafluoroborate and tetrachlorozincate.

The radical D of the diazo component is preferably derived from an aniline or naphthalene derivative.

Compounds of the formula (II) may be obtained by reaction of a diazo compound of an amine of the formula (IV):

D—NH₂    (IV)

with a compound of the formula (V):

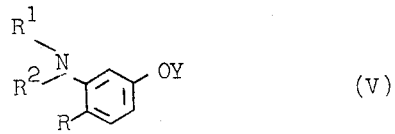

by a conventional method.

Examples of amines of the formula (IV) are: aniline, 4-toluidine, 4-chloroaniline, 5-chloro-2-methoxyaniline, aniline-3-sulfonic acid, aniline-4-sulfonic acid, 4-toluidine-2-sulfonic acid, 1-aminonaphthalene-5-sulfonic acid and 2-aminonaphthalene-4,8-disulfonic acid.

Examples of coupling components of the formula (V) are: 3-methoxyaniline, 3-methoxy-N-(β-cyanoethyl)-aniline, 3-methoxydiphenylamine, 3-methoxydimethylaniline, 3-ethoxydiethylaniline, 2-methyl-5-methoxyaniline, 2-methyl-5-methoxy-N-ethylaniline, 2,5-dimethoxyaniline, 2,5-diethoxyaniline, 2,5-dimethoxy-N-(β-cyanoethyl)-aniline and 3-ethoxy-4'-methyldiphenylamine.

Examples of compounds of the formula (III) are: 3-dimethylaminophenol, 3-diethylaminophenol, 3-amino-4-methylphenol, 3-ethylamino-4-methylphenol, 3-N-(β-cyanoethyl)-amino-4-methylphenol and 3-dimethylamino-4-methylphenol.

Reaction of compounds of formula (II) with compounds of formula (III) in the presence of an acid condensing agent is conveniently carried out in an organic solvent which may contain water.

Suitable acid condensing agents or catalysts are inorganic or organic acids, complex salts or Lewis acids. Specific examples are hydrogen chloride, aqueous hydrochloric acid, sulfuric acid, nitric acid, phosphoric acid, p-toluenesulfonic acid, naphthalene-2-sulfonic acid, phenol, zinc chloride, glacial acetic acid/ammonium acetate, glacial acetic acid/sodium acetate, boric acid and complex glycol and glycerol boric acids.

Examples of solvents are alcohols such as ethanol, propanol or isobutanol; glycols such as ethylene glycol or diethylene glycol; glycol ethers such as ethylene glycol or diethylene glycol monomethyl, monoethyl or monobutyl ether; carboxylic acids such as formic acid, acetic acid or propionic acid; carboxamides such as formamide, dimethylformamide or N-methylpyrrolidone and also acetonitrile and dimethylsulfoxide.

Reaction of components (II) and (III) is carried out at elevated temperature, for example within the approximate range of from 50° to 150°C. Temperatures of from about 80° to 130°C are preferred.

The temperature used is advantageously about 10°C above the temperature at which the reaction commences; the commencement of the reaction may be recognized by the sudden rise in temperature during heating or by the discoloration and may also be followed chromatographically.

The reaction rate may be increased by adding small amounts of substances having a reducing action such as zinc dust or sodium dithionite.

Some of the dyes which can be prepared according to the invention are immediately precipitated from the reaction mixture and may be isolated for example by suction filtration. In the case of the more soluble dyes for example the solvent may be separated or the reaction mixture may be diluted with water to isolate the dye. Precipitation of the dye salts may as usual be promoted by adding salts of mineral acids such as sodium chloride, potassium chloride, sodium sulfate, sodium nitrate or zinc chloride or aromatic sulfonic acids. If the dye contains primary or secondary amino groups it may also be converted with sodium hydroxide into the anhydro base and thus isolated. The dye salt may be obtained therefrom with an acid and the dye salt may be isolated or used for the production of a liquid formulation.

Dyes of the formula (I) are particularly suitable for dyeing acid-modified synthetic fibers of polyacrylonitrile, polyamides or polyesters.

The process of the invention is of particular significance for the production of compounds of the formula (Ia):

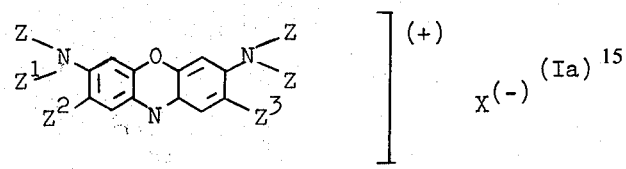

in which
Z is hydrogen, methyl or ethyl;
$Z^1$ is hydrogen, methyl, ethyl, cyanoethyl, phenyl or methylphenyl;
$Z^2$ is hydrogen, methyl or methoxy;
$Z^3$ is hydrogen or methyl; and
$X^{(-)}$ is an anion.

Some of the dyes which can be obtained by the process are already known from the literature. They are generally produced by condensation of a 4-nitrosoaniline derivative with a 3-aminophenol (German Pat. No. 300,253 inter alia). In the new process 2-alkoxy-4-aminophenylazo compounds may be used which are simpler to handle and some of which are more easily prepared.

It has already been disclosed that quaternary phenoxazine dyes can be obtained by condensation of 4-aminophenylazo compounds or 2-hydroxy-4-aminophenylazo compounds with 3-aminophenols (German Pat. Nos. 71,250, 81,242, 82,233, 82,291 and 87,901). The process of the invention proceeds at a much lower temperature under milder conditions so that the end products are obtained in higher purity and yield.

The following Examples illustrate the invention. Unless otherwise stated, parts and percentages are by weight.

EXAMPLE 1

35 parts of the azo compound obtained from diazotized sulfanilic acid and 2,5-dimethoxyaniline, 20 parts of 3-diethylaminophenol and 20 parts of ammonium acetate are heated in 130 parts of glacial acetic acid until the evolution of heat which sets in at about 80°C indicates the commencement of the reaction. The temperature is thereafter kept for another forty minutes at 85°C and the mixture is then poured into a solution of 120 parts of sodium hydroxide in 1,000 parts of ice-water. The red brown dye base precipitated is filtered off; the sulfanilic acid used for the production of the azo compound is contained as the sodium salt in the filtrate. The dye base is dissolved in 1,500 parts of water with 25 parts of acetic acid, 3 parts of activated carbon is added and the solution filtered. The dye is precipitated as dye salt with 55 parts of a 50% zinc chloride solution and 400 parts of sodium chloride, filtered off and dried. 36 parts of a dye is obtained which dissolves in water with a blue color and gives blue colorations on polyacrylonitrile fibers which have good fastness properties.

EXAMPLE 2

17.5 parts of the azo compound obtained from diazotized sulfanilic acid and 2,5-dimethoxyaniline and 22 parts of 3-ethylamino-4-methylphenol are boiled in 60 parts of ethanol for two hours after the addition of 0.35 part of zinc dust and 11.5 parts of 10N hydrochloric acid. After cooling the product is suction filtered, washed with 20 parts by volume of ethanol and dried. The dye dissolves in water with a violet color and gives blue violet colorations on polyacrylonitrile fibers.

EXAMPLE 3

15 parts of the azo compound from diazotized aniline and 3-ethoxydiethylaniline, 10 parts of 3-diethylaminophenol and 20 parts of a 50% aqueous zinc chloride solution are heated under reflux in 70 parts of isobutanol for three hours. The mixture is allowed to cool, 400 parts of benzene is added, and the product is suction filtered, washed with benzene and dried.

The dye salt obtained dissolves in water with a blue color and dyes polyacrylonitrile fibers a greenish blue which is fast to light and washing.

EXAMPLE 4

17 parts of the azo compound from diazotized 4-chloroaniline and 3-ethoxydiethylaniline is heated with 10 parts of 3-diethylaminophenol and 15 parts of 50% zinc chloride solution in 50 parts of β-hydroxyethyl methyl ether (ethylene glycol monomethyl ether) for ninety minutes at 120°C. After cooling the product is suction filtered and dried. The dye is equivalent in tinctorial characteristics to that of the preceding Example.

EXAMPLE 5

A solution of 20 parts of boric acid in 80 parts of glycol is dehydrated at 160°C. After cooling 38 parts of the azo compound from diazotized sulfanilic acid and 3-methoxydiphenylamine and 20 parts of 3-diethylaminophenol are added thereto. The whole is heated at 100°C for 2 hours, then diluted with 1,000 parts of water and suction filtered. The filter cake is converted into the dye base by stirring with dilute aqueous caustic soda solution. The filtered base is stirred with 1,000 parts of water and 25 parts of 10N hydrochloric acid. Then 100 parts of sodium chloride is added and the product is filtered and dried. The dye obtained gives greenish blue colorations having good fastness properties on polyacrylonitrile fibers.

The dyes characterized by their substituents in the following Table may be obtained analogously to the methods described:

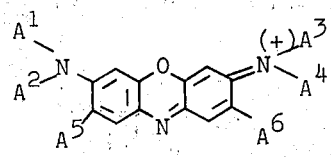

| Ex. | A$^1$ | A$^2$ | A$^3$ | A$^4$ | A$^5$ | A$^6$ | Shade |
|---|---|---|---|---|---|---|---|
| 6 | H | C$_2$H$_4$CN | C$_2$H$_4$CN | CH$_3$ | CH$_3$ | H | blue |
| 7 | H | " | " | CH$_2$C$_6$H$_5$ | OC$_2$H$_5$ | CH$_3$ | greenish blue |
| 8 | H | 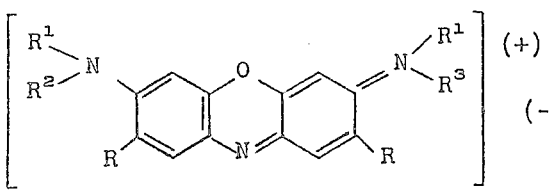 | H | C$_2$H$_5$ | H | CH$_3$ | greenish blue |
| 9 | H | C$_2$H$_9$ | CH$_3$ | CH$_3$ | OCH$_3$ | CH$_3$ | " |
| 10 | H | C$_2$H$_5$ | H | C$_2$H$_4$C$_6$H$_5$ | CH$_3$ | CH$_3$ | " |
| 11 | H | C$_2$H$_4$OH | C$_2$H$_5$ | C$_2$H$_5$ | CH$_3$ | H | reddish blue |

We claim:

1. A process for the production of an oxazine dye of the formula:

$$\left[ \begin{array}{c} R^1 \\ R^2 \end{array} N \underset{R}{\overset{}{\bigcirc}} O \underset{R}{\overset{}{\bigcirc}} N \begin{array}{c} R^1 \\ R^3 \end{array} \right]^{(+)} (-)^X$$

in which

R is hydrogen, methyl, methoxy or ethoxy;
R$^1$ is hydrogen, alkyl of one to four carbon atoms, benzyl or phenylethyl;
R$^2$ is hydrogen, alkyl of one to four carbon atoms, cyanoethyl, hydroxyalkyl of two or three carbon atoms, phenyl or methylphenyl;
R$^3$ is hydrogen, alkyl of one to four carbon atoms or cyanoethyl; and
X$^{(-)}$ is an anion. which process comprises:
reacting at a temperature within the approximate range from 50°C. to 150°C. a compound of the formula:

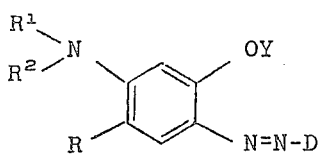

with a compound of the formula:

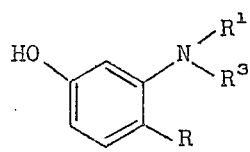

in the presence of an acid condensing agent selected from the group consisting of inorganic or organic acids, phenol, complex glycol or glycerol boric acids, and Lewis acids,
Y being alkyl,
D being phenyl; phenyl substituted by methyl, chloro, methoxy or sulfonic acid; naphthyl; or naphthyl substituted by sulfonic acid and R, R$^1$, R$^2$ and R$^3$ having the same meaning given above.

2. A process as claimed in claim 1 wherein the diazo component D is derived from an aniline or aminonaphthaline compound.

3. A process as claimed in claim 1 carried out in an organic solvent with or without water.

4. A process as claimed in claim 1 carried out a temperature of from about 80° to 130°C.

5. A process as claimed in claim 1 carried out at a temperature 10°C above that at which the reaction starts.

6. A process as claimed in claim 1 wherein the oxazine dye produced has the formula:

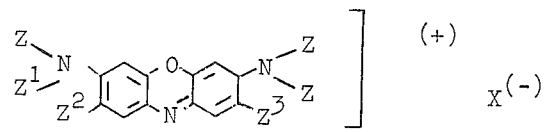

in which Z is hydrogen, methyl or ethyl;
Z$^1$ is hydrogen, methyl, ethyl, cyanoethyl, phenyl or methylphenyl;
Z$^2$ is hydrogen, methyl or methoxy;
Z$^3$ is hydrogen or methyl; and
X$^{(-)}$ is an anion.

7. A process as claimed in claim 6 wherein the process is carried out in an organic solvent at a temperature of from about 80° to 130°C.

8. A process as claimed in claim 1 wherein the reaction is accelerated by adding a reducing agent selected from the froup consisting of zinc dust and sodium dithionate.

9. A process as claimed in claim 6 wherein the reaction is accelerated by adding a reducing agent selected from the group consisting of zinc dust and sodium dithionate.

10. A process as claimed in claim 1 wherein D is selected from the group consisting of phenyl, 4-methylphenyl, 4-chlorophenyl, 5-chloro-2-methoxyphenyl, phenyl-2-sulfonic acid, phenyl-4-sulfonic acid, 4-methylphenyl-2-sulfonic acid, 1-naphthyl-5-sulfonic acid and 2-naphthyl-4,8-disulfonic acid.

11. A process as claimed in claim 6 wherein D is selected from the group consisting of phenyl, 4-methylphenyl, 4-chlorophenyl, 5-chloro-2-methoxyphenyl, phenyl-2-sulfonic acid, phenyl-4-sulfonic acid, 4-methylphenyl-2-sulfonic acid, 1-naphthyl-5-sulfonic acid and 2-naphthyl-4,8-disulfonic acid.

* * * * *